Figure 1:
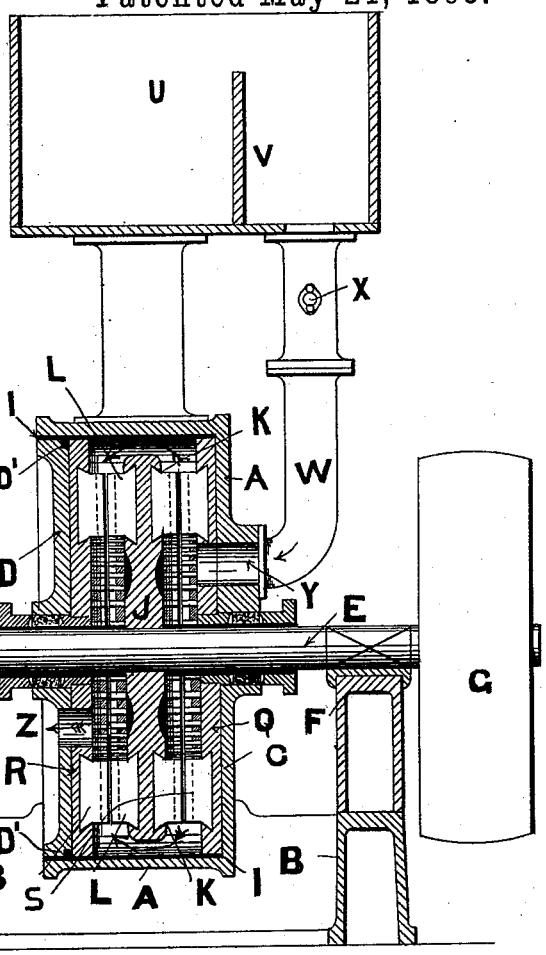

(No Model.) 2 Sheets—Sheet 1.

D. PEARSON & D. N. BERTRAM.
PULP REFINING ENGINE.

No. 539,704. Patented May 21, 1895.

Witnesses:
G. W. Rea
Thos. A. Green

Inventors
David Pearson and
David N Bertram
By James L. Norris
atty.

(No Model.) 2 Sheets—Sheet 2.

D. PEARSON & D. N. BERTRAM.
PULP REFINING ENGINE.

No. 539,704. Patented May 21, 1895.

Witnesses:
G. N. Rea,
Thos. A. Green

Inventors:
David Pearson and
David N. Bertram
By James L. Norris
atty

UNITED STATES PATENT OFFICE.

DAVID PEARSON, OF SHOTLEY BRIDGE, ENGLAND, AND DAVID NOBLE BERTRAM, OF EDINBURGH, SCOTLAND; SAID BERTRAM ASSIGNOR TO SAID PEARSON.

PULP-REFINING ENGINE.

SPECIFICATION forming part of Letters Patent No. 539,704, dated May 21, 1895.

Application filed February 5, 1894. Serial No. 499,139. (No model.) Patented in England June 17, 1893, No. 11,956, and in France July 6, 1893, No. 231,351.

*To all whom it may concern:*

Be it known that we, DAVID PEARSON, a resident of Shotley Bridge, in the county of Durham, England, and DAVID NOBLE BERTRAM, a resident of Edinburgh, in the county of Edinburgh, Scotland, subjects of the Queen of Great Britain and Ireland, have invented an Improved Pulp-Refining Engine, (for which we have obtained patents in Great Britain and Ireland, No. 11,956, bearing date June 17, 1893, and in France, No. 231,351, bearing date July 6, 1893,) of which the following is a specification.

In the treatment of pulp used in the manufacture of paper it is found very desirable after the pulp has passed through the ordinary beating engine to further disintegrate or refine the same so that the pulp fibers shall be drawn out to a greater uniformity in length before the pulp is made into paper. Our invention has for its object to accomplish this desirable end, and consists of the improved construction of refining engine hereinafter described.

In accordance with our invention we employ a cylindrical casing which is formed, by preference of cast iron, and bolted to a bed or base plate and one end of said casing is closed while the opposite end is open, but fitted with a "piston" end. Within this casing a disk or circular plate is inclosed keyed upon a shaft which passes through one or both ends of the casing and said shaft is supported in pedestal bearings carried by the bed plate aforesaid and fitted with a driving pulley. Upon each side of said disk an annular, by preference, dovetail recess is formed which serves to carry a number of cutter bars which are more or less of a rectangular formation and of comparative thinness with one portion of their extremities formed dovetail to coincide with the dovetail recesses. Said cutter bars are arranged radially around the shaft with a tapered strip of wood between each to allow for this and keep them a sufficient distance apart. Openings are formed at suitable intervals to allow for the introduction of the bars into said recesses which are fitted with key strips after the bars are set and screwed or riveted in position. Within the casing two other disks are employed, one fixed to the piston end and the other to the closed end of the casing, and in the opposite faces of these disks annular dovetail grooves are formed similar to those in the disk aforesaid. Cutter bars similar to those aforesaid are introduced into these grooves, but instead of being set radially they are set tangentially, the wooden packing strips being shaped accordingly.

Into the casing fitted as above described the pulp to be treated is passed, which enters through an opening in one end of the casing from a supply tank fixed immediately above the engine and passes between both sets of cutter bars, that is, between the bars on one side of the revolving disk, those on the opposite side and those on the stationary disks, a sufficient space being left between the periphery of the revolving disk and the casing interior to allow for the pulp to pass round. Motion being imparted to the shaft aforesaid the disk mounted thereon is caused to revolve and the cutter bars acting upon the pulp thoroughly and completely disintegrate the fibers, the tangential setting of the cutter bars on the stationary disks producing a shearing action which tends to draw the fibers out to a greater uniformity of length than heretofore. After treatment the pulp escapes in its refined state through an opening in the closed end of the casing into a pipe and is then led away as desired.

As the cutter bars become worn away they may be brought up to each other by sliding the piston end of the casing inward, the shaft on which the revolving disk is mounted being capable of sliding in its bearings. To facilitate such adjustment we employ a screw working through a fixed bracket and serving to operate a movable cross-head secured to the piston end of the casing so that by turning the screw the cross head is caused to push in the piston end of the casing and so cause the disks and cutter bars to approach each other and compensate for the wear.

In order that our said invention shall be the more readily understood and carried into practical effect we have hereunto annexed two sheets of drawings and will now proceed to describe the same with the assistance of the various letters of reference marked thereon.

Figure 2:
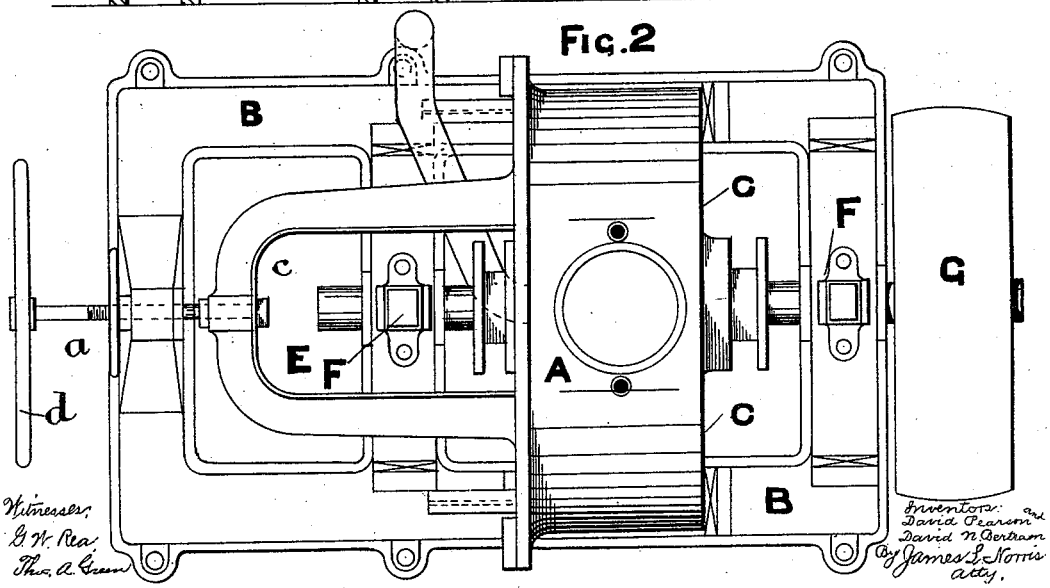

Figure 1 is a sectional elevation, and Fig. 2 is a plan view, of our improved refining-engine. Figs. 3 to 18 are detail views of our improved refining-engine.

In accordance with our invention we employ a strong, by preference cast iron casing A, which is bolted at each side to and supported by the bed plate B, and said casing as illustrated is closed at end C, but open at the opposite end. In the open end of the casing the piston end D is fitted, which is provided with a spring packing ring D' to facilitate the sliding in and out of the end and keep the joint "water-tight." Extending through stuffing boxes or glands in both ends of the casing is the shaft E supported in pedestal bearings F rising from the bed plate B. Said shaft is fitted with the driving pulley G and is covered at H with a thin covering or sheathing of brass or other suitable material to protect it from the action of the pulp and said sheathing is sufficiently long to allow for the sliding of the shaft. The interior of the casing at I is likewise lined with a lining of brass or other suitable material to protect it from the action of the pulp.

Figure 3:
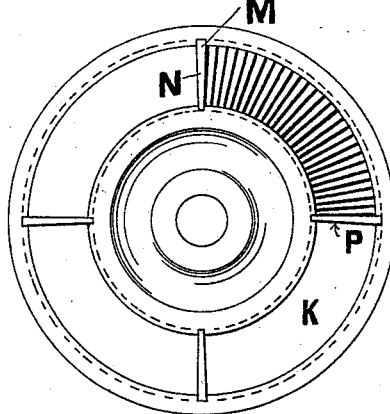
Figure 5:
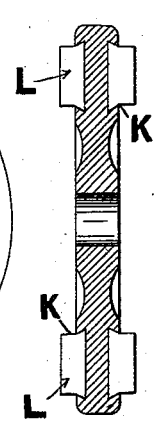
Figure 6:
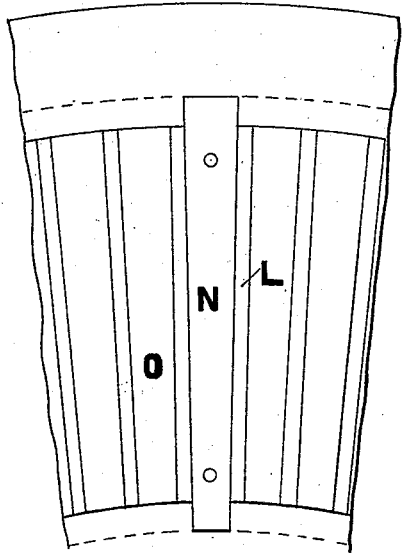
Figure 8:
Figures 9, 10:
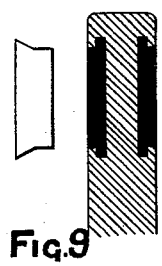
Figures 11, 12:
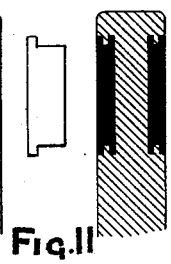
Figure 13:
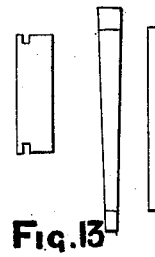
Figures 14, 15, 17:
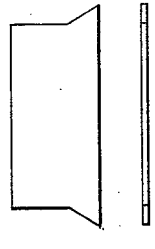

Upon the shaft E is keyed the disk J which is less in diameter than the inner circumference of the casing as illustrated to allow for a passage from side to side of the disk. In each face of said disk annular grooves or recesses K are formed which are of the cross section shown in Figs. 1, 5 and 8 or of the cross section shown in Figs. 10 and 12 and said recesses or grooves are fitted with cutter bars L, either formed as shown in Figs. 3, 14 and 15 to coincide with the dovetail recesses, or as shown in Figs. 11 and 13 to coincide with the grooves shown in Figs. 10 and 12. These cutter bars are introduced at M, the key strip N being removed and then a cutter bar L and wooden strip (see enlarged views Figs. 16 and 17) are inserted alternately and brought round to the fixed key strip P until the groove is full, the key or locking strip N being then inserted in position and screwed or riveted to the disk. The wooden wedges are of such a taper that the cutter bars are caused when set to lie radially around the shaft E as illustrated in Figs. 3 and 6.

Figure 4:
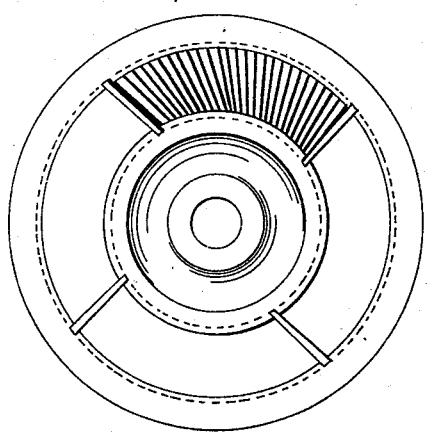
Figure 7:
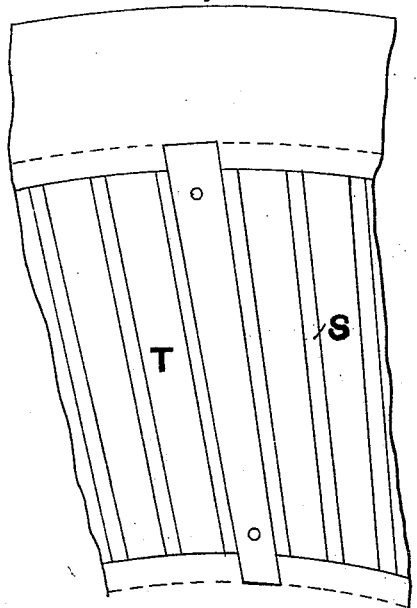
Figures 16, 18:
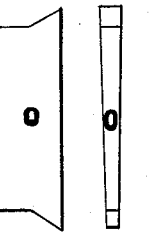

Upon the closed end of the casing the disk or plate Q is fixed by means of bolts or other means and on the piston end of the casing the disk or plate R is fixed. In the faces of these disks recesses or grooves are formed similar to those in disks J or those in Figs. 1, 10 and 12 and into these grooves cutter bars S are fixed similar to those shown in Fig. 1, or those shown in Figs. 11 and 13, but said cutter bars instead of being arranged radially around the shaft are arranged tangentially or angularly as illustrated in Figs. 4 and 7, the packing strips T being formed as shown in Fig. 18.

The arrangement of the cutter bars may be reversed, the tangential setting on the revolving disk and the radial setting on the two stationary disks.

The pulp to be treated passing from the beating engine enters the tank U which has a partition V, so that any foreign matter or impurities which may enter the tank with the pulp are intercepted, the pure pulp only flowing over the partition and passing into the engine. The pulp is led into the engine through pipe W (fitted with stop cock X to control the flow) and through the inlet opening Y in the closed end of the casing and after passing between the cutter bars and around the disk as indicated by the arrows passes out through the opening Z in the piston end of the casing. The cutter bars S, S, are so placed in each of the stationary disks that when said disks are placed in the casing A facing each other the said bars are tangential in the same direction. The inlet opening may be arranged in the piston end of the casing and the outlet opening in the closed end, the cutter bars being arranged accordingly.

To compensate for the wear of the cutter bars the piston end D is caused to slide forward into the casing A and to facilitate such movement we employ a finely pitched screw (a) working through a fixed bracket (b) and operating a cross head (c) which is secured to the piston end D as illustrated. By turning the hand wheel (d) the piston end is caused to slide into the casing and so adjust the cutter bars as aforesaid.

The engine is sometimes provided with a vertical delivery box on the outlet pipe, by preference of a height corresponding to that of the supply tank to allow for the accumulation of refined pulp passing from the engine.

A modified construction of our improved engine consists in carrying the shaft E through one end of the casing only and supporting the same by two pedestal bearings on that side of the engine, the inlet orifice in this case entering if desired in the center of the opposite side of the casing.

It will be obvious that these improvements are applicable to existing engines, particularly the means of adjusting the cutter bars when worn, the fine screw and cross head dispensing with the old form of screw and worm hitherto used and so difficult to turn.

Having thus particularly described and ascertained the nature of our said invention and in what manner the same is to be performed, we declare that what we claim is—

In a paper pulp refining engine, the combination of the cylindrical casing A having a permanently closed end C and a sliding piston end D, the stationary or non-rotating disks Q R fixed to the inner sides of the casing ends C D, respectively, the rotary disk J mounted between the fixed disks on a shaft
5 E provided with a pulley, cutter bars L S detachably keyed to the opposing faces of the several disks, the cross-head $c$ secured to the piston end D, a finely pitched screw $a$ connected with said cross-head for adjusting the
10 piston end D and attached cutter-disk, and bearings for said screw and for the shaft of the rotary-disk, substantially as described.

In testimony whereof we have hereunto set our hands in the presence of witnesses.

DAVID PEARSON,
   DAVID NOBLE BERTRAM.

Witnesses:
 JOHN BOOTH,
  *Notary Public.*
 ERNEST H. HAYWARD,
  *His Clerk.*
 JOHN MUNRO,
 DANIEL DORR,
*Clerks to Bertram, Limited, Edinburgh.*